Patented Mar. 26, 1946

2,397,218

UNITED STATES PATENT OFFICE 2,397,218

CONVERSION OF HYDROCARBONS

John F. Sturgeon, El Dorado, Ark., assignor to Universal Oil Products Company, Chicago, Ill., a corporation of Delaware No Drawing. Application June 18, 1943,
Serial No. 491,391

12 Claims. (Cl. 260—683.3)

This is a continuation-in-part of my co-pending application, Serial #433,442, filed March 5, 1942, now United States Patent 2,335,550 issued November 30, 1943, which in turn is a continuation-in-part of application, Serial #293,923, filed September 8, 1939, now United States Patent 2,278,223 issued March 31, 1942.

This invention relates to the treatment of hydrocarbons to produce therefrom less-saturated hydrocarbons containing the same number of carbon atoms but a smaller number of hydrogen atoms per molecule. In a more specific sense, the invention is concerned with a process for dehydrogenating aliphatic hydrocarbons.

Paraffinic hydrocarbons, which are present in considerable amounts in natural gases, casinghead gases, cracked gases, etc., and which are frequently used only as fuel, are convertible into more useful unsaturated hydrocarbons by dehydrogenation in the presence of catalysts hereinafter set forth. Butenes and higher olefins are converted into diolefins, and normally liquid paraffinic hydrocarbons are transformed into more useful olefinic and diolefinic products by catalytic dehydrogenation.

In a broad aspect the present invention comprises a hydrocarbon conversion process wherein hydrocarbons are reacted at conversion conditions in the presence of a catalyst which at some stage in its manufacture has a component or components existing as a gelatinous hydrogel, which hydrogel has been subjected to freezing and thawing to destroy its gelatinous structure.

In one embodiment the present invention comprises a process for dehydrogenating aliphatic hydrocarbons in the presence of a catalyst prepared by forming a hydrogel of a metal oxide, freezing and then thawing said hydrogel to destroy its gelatinous structure and to convert it into a finely divided powder, and compositing with said powder at least one additional catalytic substance such as a metal oxide to form a composite dehydrogenating catalyst.

In a more specific embodiment the present invention comprises a process for dehydrogenating aliphatic hydrocarbons in the presence of a catalyst formed by precipitating an alumina hydrogel by the addition of a base to an aqueous solution of an aluminum salt selected from the group consisting of the chloride, nitrate and sulfate, sufficiently freezing and then thawing said hydrogel to destroy its gelatinous structure and to convert it into a substantially amorphous and non-gelatinous powder and an aqueous solution, removing a major proportion of said aqueous solution from said powder, washing the powder to remove water-soluble impurities, and mixing the powder with a solution of a metal compound under conditions to impregnate the powder with the oxide of said metal, heating to remove water, drying the composite, forming, and calcining to produce an active dehydrogenating catalyst.

The catalysts employed in the process of the present invention have relatively higher dehydrogenating activities than those previously prepared from the same starting materials by methods not involving freezing and thawing of hydrogels as herein set forth. The essential feature of the present invention is the use of catalyst composites containing a component prepared by freezing and thawing hydrogels or hydrous oxides to eliminate water and then utilizing subsequent steps involving washing to remove impurities, forming, and calcining to produce formed particles or powdered catalyst of high dehydrogenating activity.

An advantage of utilizing freezing of a hydrogel during the preparation of dehydrogenating catalysts is that the frozen and thawed material may more easily be washed substantially free from impurities such as alkali metal compounds than is possible when washing the original hydrogels. Furthermore, grinding of the frozen, thawed, purified and dried composite is frequently unnecessary before forming it into catalyst particles; and several drying and screening operations are avoided which must ordinarily be made when removal of impurities from precipitated hydrogel catalysts is effected mainly by washing. Also the apparent density of a catalyst prepared from a frozen hydrogel composite is less than that of a similar catalyst prepared from the same kinds of hydrogels which have not been frozen but have been washed to remove water-soluble impurities. The term apparent density is used in reference to the ratio of the weight of unit gross volume of catalyst to the weight of an equal gross volume of water.

The hydrogel or hydrous oxide which is subjected to the freezing and thawing treatment in accordance with the preferred embodiment of the present invention has relatively low dehydrogenating activity in itself and thus may comprise the hydrous oxides of aluminum, magnesium, zinc and cadmium. When these oxides are present with other oxides in complex composites, the materials of relatively low dehydrogenating activities are commonly looked upon as carriers, supports, or spacing agents, although they sometimes exhibit specific promoting effects which are not exactly in accord with their individual activities in such reactions. Alumina hydrogel is particularly suitable for treatment in accordance with the present invention and therefore is preferred.

The exact conditions which are optimum for the freezing treatment of the gels, such as temperature and rate and time of freezing, are dependent upon the composition of the gel in question, its water content, and other factors. During freezing, the hydrogel composite loses its gel structure so that the thawing of the frozen material produces an aqueous solution and a fine powder or granular material, the latter being readily separable from the aqueous solution. The solid powdered material so obtained by the thawing of the hydrogel may then be washed with water to remove water-soluble impurities and then dried, or preferably the powdered material may be dried, washed, and again dried. If desired, the powdered material may be ground further and formed into particles by extrusion, pelleting, or other similar methods with or without the addition of promoters prior to the particle-forming operation. The pelleted, otherwise formed, or powdered catalytic material is then calcined at a temperature from about 900° to about 1500° F. to produce active catalyst.

The other component or components having a higher dehydrogenating activity than alumina, for example, and which are composited with the alumina, include compounds and particularly the oxides of the following elements: titanium, zirconium, and thorium in the left-hand column of group IV of the periodic table; silicon and tin in the right-hand column of group IV; vanadium, columbium, and tantalum in the left-hand column of group V; chromium, molybdenum, and tungsten in the left-hand column of group VI; and iron, nickel, and cobalt constituting the fourth series of VIII.

Since substantially all of the oxides of these elements are alternatively utilizable in producing catalyst composites having dehydrogenating activities, it is readily seen that a considerable number of alternatively utilizable composite materials can be produced, although obviously the catalytic activities of the different possible composites will not be exactly equivalent, particularly when dehydrogenating different hydrocarbons which may thus be converted into other hydrocarbons having the same number of carbon atoms but a smaller number of hydrogen atoms per molecule. Some of the oxides of these elements possess greater dehydrogenating activities than others, and some of the materials produced by the reduction of the oxides have greater activities than their oxides as is the case with iron, nickel, and cobalt. The oxides of chromium, molybdenum, tungsten, and vanadium all have outstanding activities in reactions involving the direct dehydrogenation of aliphatic hydrocarbons including particularly alkanes, alkenes, and arylalkanes, although in this group of oxides there are variations in activities with different hydrocarbons. The oxides of silicon, titanium, zirconium, cerium, and thorium usually have lower dehydrogenating potency than those of chromium, molybdenum, tungsten, and vanadium and among themselves, cerium is usually highest in activity.

In preparing dehydrogenation catalysts of the alumina-chromia-magnesia type, alumina may be composited and mixed with chromia and magnesia in several ways to form composites which may be calcined to produce active dehydrogenating catalysts.

According to one method of preparation a precipitated alumina hydrogel is prepared by addition of a base to an aluminum salt, as the chloride, nitrate, or sulfate, or precipitated alumina hydrogel is formed by the addition of an acid such as hydrochloric or sulfuric, or of a solution of an aluminum salt, to a sodium aluminate solution. Alumina hydrogel so formed is frozen and then thawed so as to break down the gel structure, producing hydrated aluminum oxide in powdered form, which is separated from mechanically removable water, washed to remove water-soluble impurities, and dried. It is preferable to precede the washing step by drying treatments. The finally dried powder is then impregnated with a solution of chromic acid dissolved in water, and the desired quantity of magnesium oxide is then added to the impregnated powder. The resultant composite of hydrous aluminum oxide and compounds of chromium and magnesium is then dried and calcined; or dried, formed into particles, and calcined.

According to a second method, hydrated aluminum oxide is prepared by precipitation, and the hydrogel is frozen and then thawed, washed, and dried as in the first method. Then the hydrated aluminum oxide is activated by being calcined at a temperature between about 900° and about 1500° F. to produce activated alumina which is impregnated with chromic acid solution and the desired amount of magnesium hydroxide is added thereto.

The process of freezing precipitated hydrogels is applicable particularly to the preparation of dehydrogenation catalysts, such as alumina-chromia and alumina-chromia-magnesia, and may be used also in the preparation of any other catalyst which may be produced in the form of a precipitated hydrogel which requires washing to remove water-soluble impurities therefrom. Thus the freezing and thawing operations utilized in the production of the preferred dehydrogenation catalyst of the present invention may be applied to substantially any type of catalytic material which exists as a hydrogel during one phase of its manufacture and requires repeated washed with water and aqueous solutions to remove deleterious impurities.

It is usually good practice in the final steps of preparation of dehydrogenation catalyst composites to calcine them at a temperature between about 900° and about 1500° F. Such calcination treatment does not cause complete dehydration of the hydrated oxides, but gives catalytic materials of good structure and porosity so that they are able to resist for a long time the deteriorating effects of the service and reactivation period to which they are subjected.

The dehydrogenating value of different composites and the activity of composites having different proportions of oxide ingredients have been found to vary considerably with the methods of preparation of the composites. In the case of alumina-chromia-magnesia catalysts the most effective and economical proportions comprise major amounts of alumina and relatively minor amounts of chromia and magnesia; while in other cases best results are obtained when employing catalysts containing major amounts of catalyst components having relatively high dehydrogenating activities and minor amounts of oxides having relatively low catalytic activities such as alumina, magnesia, zinc oxide, and cadmium oxide.

In carrying out the dehydrogenation of various hydrocarbons according to the present process, a solid composite catalyst in the form of particles of graded size or small pellets and prepared as hereinbefore set forth, is used as a filler in reaction tubes, reactors, or chambers and the hydrocarbon to be dehydrogenated is passed through the catalyst after being heated to the proper temperature which is usually between about 750° and about 1400° F., although more commonly between about 900° and about 1200° F. The catalyst reactors may also be heated exteriorly to maintain the proper temperature for the reaction which is carried out under a pressure which may be subatmospheric, atmospheric, or superatmospheric. While pressures up to approximately 500 pounds per square inch may be employed in some cases, pressures of atmospheric or below are frequently preferred. The time during which the hydrocarbons are exposed to dehydrogenating conditions in the presence of the preferred catalyst is comparatively short and is usually less than about 20 seconds.

As an alternative mode of operation using dehydrogenating catalysts of the character herein set forth, they may be employed in finely divided condition in stationary or moving masses through which the vapors of the hydrocarbons are passed. Such operations may be conducted so that there is relatively little mechanical loss of catalyst from the reaction zone because of the carrying action of the reactant streams, or the rate of flow of vapors may be adjusted so that definite amounts of powdered catalyst are carried from the reaction zone and later separated from the treated vapors and reactivated by suitable treatment with an oxygen-containing gas mixture.

In this specification and in the claims, the term aliphatic hydrocarbons is used in referring to alkanes, alkenes, and arylalkanes which are converted into more unsaturated hydrocarbons in the presence of the dehydrogenating catalysts herein described. Under the operating conditions also herein set forth the aliphatic hydrocarbons lose hydrogen from the carbon chain of the respective hydrocarbons. Under some circumstances the addition of steam to the hydrocarbon undergoing dehydrogenation, particularly in the case of hexane and higher hydrocarbons, is favorable to the production of olefinic hydrocarbons.

The time of contact employed will vary with the activity of the catalyst used, the temperature employed, and the hydrocarbon or hydrocarbon mixture undergoing treatment. The relatively low molecular weight paraffins such as ethane and propane are generally more difficult to dehydrogenate than the higher normally gaseous and liquid paraffins. Paraffinic hydrocarbons frequently require a higher catalyst temperature or longer time of contact than do the corresponding olefins which are convertible into diolefinic hydrocarbons by dehydrogenation, said diolefin formation being carried out generally at a subatmospheric pressure. Production of arylalkenes by catalytic dehydrogenation of ethyl-benzene or other alkylated aromatic hydrocarbons having at least one ethyl group or higher alkyl group, is preferably carried out at a relatively high temperature by use of a short time of contact in the presence of the catalyst and under a reduced pressure in order to obtain a relatively high yield of desired product without excessive hydrocarbon decomposition and rapid decrease in catalyst activity due to carbonization.

Since the usual method of operating commercial dehydrogenation plants is to utilize several catalyst reactors, each containing at least one fixed catalyst bed, connected in parallel so that one reactor may be utilized in dehydrogenating a hydrocarbon charge while the catalyst in the other reactor is being reactivated, as by heating in an oxygen-containing gas, it is preferable to so balance conditions in the two parts of the cycle that the times of processing and reactivation are substantially equal. A further problem to be solved by trial is the question of the length of the operating cycle, since best overall results are usually obtained in continuous plants when operations are conducted for relatively short intervals followed by a correspondingly short time of reactivation rather than by allowing the catalyst particles to become contaminated excessively by carbonaceous deposits.

Products from the catalytic reactors are subjected to suitable treatment to remove therefrom the hydrocarbons formed by dehydrogenation, while the unconverted hydrocarbon material is recycled to further contact with the catalyst. For example, olefinic or diolefinic materials resulting from dehydrogenation of paraffins, olefins, or alkylated aromatic hydrocarbons may be subjected to polymerization in the presence of suitable catalysts or they may be treated directly with chemical reagents to produce other desirable and commercially valuable derivatives. After the most reactive products have been removed, the residual materials are then recycled for further treatment with or without complete removal of hydrogen.

Many of the composites included in the present types of catalysts are selective in removing two hydrogen atoms from a paraffin molecule to produce the corresponding olefin without furthering to any great extent undesirable side reactions, and because of this, there is an unusually high conversion of paraffins into olefins, as will be shown in the example. When the activity of such a catalyst begins to diminish, it is readily reactivated by the expedient of oxidizing with air or other oxidizing gas at a moderately elevated temperature, usually within the range employed in the dehydrogenating reactions. This oxidation effectively removes most of the carbonaceous deposits which gradually contaminate the surface of the particles during the processing period and decrease their efficiency. It is characteristic of such catalysts that they may be reactivated repeatedly without substantial loss of catalytic efficiency.

When reactivating partly spent catalysts by oxidation with air or other oxidizing gas mixtures, lower metal oxides are sometimes oxidized to higher oxides which may combine to a greater or lesser extent with some of the other components in the catalyst mixture to form salts. For example, the oxide $Cr_2O_3$ is extensively oxidized to $CrO_3$ during reactivation of the spent alumina-chromia catalyst with an oxidizing gas mixture and the chromium trioxide combines with alumina to form a chromate. Later, this chromate, or the adsorption complex of $CrO_3$ on $Al_2O_3$ is apparently decomposed by contact with reducing gases in the first stages of service to reform the green sesquioxide $Cr_2O_3$, and to regenerate the real catalyst and hence the catalytic activity.

In the dehydrogenation of butanes it has been found essential that particular conditions of operation be observed in order to produce maximum yields of butenes in the presence of aluminum oxide-chromium sesquioxide catalysts of suitable activity. In regard to temperature, the optimum range is from about 1000° to about 1200° F., at the surface of the catalytic particles. It is essential, in combination with a suitable hourly space velocity (volume of butane charged per hour per volume of gross catalyst space), that this temperature be maintained within this relatively narrow range and that it be measured in the catalyst mass at a sufficient number of points so that the average temperature falls within this interval. It is customary in many commercial plants to measure inlet and outlet temperatures of catalyst chambers and to consider the average temperature to be the mean of these two. But this is not accurate practice, since dehydrogenation reactions are endothermic and the average temperature would not be represented by the mean of the inlet and outlet on account of the need for adding heat externally.

In using the above conditions of temperature, pressure, and time, a conversion per pass of butanes to butenes of about 15 to 25 per cent is preferably effected, which, it has been found, corresponds to a minimum deposition of carbon upon the surface of the catalyst and a minimum of side reactions, such as would result in the formation of degradation products resulting from the scission of the carbon-to-carbon bonds. If a time of contact is maintained corresponding to a maximum once-through yield of butenes (which may be as high as 50 to 60%) the deposition of carbon is greatly accelerated and demethanization and other splitting reactions rather than dehydrogenation occur, whereas when approximately a 25 per cent conversion per pass is maintained it is possible to produce ultimate yields of approximately 95 per cent of butenes by recycling of unconverted butane. Further, it has been determined that in dehydrogenation of butanes by the preferred catalysts, the rate of carbon deposition passes through a minimum within the temperature range given. That is, if temperatures lower than about 1100° F. are employed and the time of contact is increased to obtain approximately 25 per cent conversion per pass, a relatively large amount of carbon is deposited and similarly the rate of carbon deposition begins to rise markedly at temperatures above about 1290° F. even though the time of contact is reduced to maintain only a 25 per cent conversion per pass.

The following example is submitted to show specific results obtained in dehydrogenating butane in the presence of catalysts prepared by methods involving the freezing and thawing of hydrogels, although the data submitted are not intended to limit correspondingly the generally broad scope of the invention.

Three comparative dehydrogenation catalysts were prepared so as to have compositions corresponding to the molecular ratios of 30 Al₂O₃: 3Cr₂O₃:2MgO. One of these composites was prepared by the usual method of the prior art comprising precipitating aluminum hydroxide from aluminum sulfate solution by the addition of aqueous ammonia, repeatedly washing to remove water-soluble impurities, and drying to produce aluminum oxide powder which was impregnated with aqueous chromic acid solution to which precipitated magnesium hydroxide had been added previously. The other two composites were prepared by methods described in this specification involving freezing and thawing of a precipitated alumina hydrogel to break up its gelatinous structure and form powdered material which was washed more easily than the gelatinous hydrogel to remove water-soluble impurities. In the preparation of the second of these active catalysts, the alumina was "activated" by heating the washed material to 950° F. prior to compositing with chromia and magnesia.

Each of these three catalyst composites was dried, formed into 3 x 3 mm. cylindrical particles by a pelleting machine, and then calcined in air for 10 hours at 1472° F. The catalysts so prepared were utilized as fillers in steel tubes through which a commercial butane fraction was passed at 1112° F. under atmospheric pressure using an hourly gaseous space velocity of 1500 and a dehydrogenating period with a duration of 45 minutes. The commercial butane fraction charged contained 4.3 mole per cent propane, 54.0 per cent isobutane, 40.9 per cent normal butane, and 0.8 per cent pentanes. The results obtained per pass in the presence of equal weights of these catalytic materials are given in the following table.

TABLE

*Dehydrogenation of a butane fraction in the presence of alumina-chromia-magnesia catalysts*

| | Catalysts prepared by— | | |
|---|---|---|---|
| | Precipitating, washing, compositing, and calcining | Precipitating, freezing, washing, compositing, and calcining | Precipitating, freezing, washing, activating, compositing, and calcining |
| Olefins produced per pass, volume per cent: | | | |
| Ethylene | 1.0 | 0.9 | 0.3 |
| Propylene | | | 1.1 |
| Butylenes | 22.2 | 28.9 | 25.5 |
| Total | 23.2 | 29.8 | 26.9 |

From the results given in the table, it is evident that dehydrogenation catalysts prepared from precipitated hydrogels which have been frozen to break down the gelatinous structure of the hydrogels are superior in dehydrogenating activities to a dehydrogenation catalyst of like composition prepared by the more tedious method of the prior art necessary when freezing and thawing are not utilized in the catalyst preparation procedure.

The character of the present invention and its novelty and utility can be seen from the preceding specification and numerical data presented, although neither section is intended to unduly limit its generally broad scope.

I claim as my invention:

1. A hydrocarbon conversion process which comprises subjecting a hydrocarbon under conversion conditions to contact with a catalyst comprising a component prepared as a gelatinous hydrogel and which hydrogel has been subjected to freezing and thawing to destroy its gelatinous structure.

2. A hydrocarbon conversion process which comprises subjecting a hydrocarbon under conversion conditions to contact with a catalyst prepared by forming a hydrogel of a metal oxide, freezing and then thawing said hydrogel to destroy its gelatinous structure and to convert it into a finely divided powder, and compositing with said powder at least one additional metal oxide to form a composite catalyst.

3. A process for dehydrogenating an aliphatic hydrocarbon which comprises subjecting the aliphatic hydrocarbon under dehydrogenating conditions to contact with a catalyst comprising a metal oxide component prepared by forming a hydrogel of a metal oxide, freezing and then thawing the hydrogel to destroy its gelatinous structure.

4. A process for dehydrogenating an aliphatic hydrocarbon which comprises subjecting the aliphatic hydrocarbon under dehydrogenating conditions to contact with a catalyst prepared by forming a hydrogel of a metal oxide, freezing and then thawing said hydrogel to destroy its gelatinous structure and to convert it into a finely divided powder, and compositing with said powder at least one additional metal oxide to form a composite dehydrogenating catalyst.

5. A process for dehydrogenating an aliphatic hydrocarbon which comprises subjecting the aliphatic hydrocarbon under dehydrogenating conditions to contact with a catalyst prepared by forming a hydrogel selected from the group consisting of aluminum oxide, magnesium oxide, zinc oxide and cadmium oxide, freezing and then thawing said hydrogel to destroy its gelatinous structure and to convert it into a finely divided powder, and compositing with said powder at least one additional metal oxide having dehydrogenating activity.

6. A process for dehydrogenating an aliphatic hydrocarbon which comprises subjecting the aliphatic hydrocarbon under dehydrogenating conditions to contact with a catalyst formed by precipitating alumina hydrogel, freezing and then thawing said hydrogel to destroy its gelatinous structure and to convert it into a finely divided powder, and compositing with said powder at least one additional metal oxide having dehydrogenating activity.

7. A process for dehydrogenating an aliphatic hydrocarbon which comprises subjecting the aliphatic hydrocarbon under dehydrogenating conditions to contact with a catalyst formed by precipitating alumina hydrogel, freezing and then thawing said hydrogel to destroy its gelatinous structure and to convert it into a finely divided powder, and compositing with said powder at least one metal oxide selected from the group comprising chromia and magnesia.

8. A process for dehydrogenating an aliphatic hydrocarbon which comprises subjecting the aliphatic hydrocarbon under dehydrogenating conditions to contact with a catalyst formed by precipitating an alumina hydrogel by the addition of a base to an aqueous solution of an aluminum salt selected from the group consisting of the chloride, nitrate and sulfate, sufficiently freezing and then thawing said hydrogel to destroy its gelatinous structure and to convert it into a substantially amorphous and non-gelatinous powder and an aqueous solution, removing a major proportion of said aqueous solution from said powder, washing the powder to remove water-soluble impurities, and mixing the powder with a solution of a metal compound under conditions to impregnate the powder with the oxide of said metal, heating to remove water, and then drying the composite, and calcining to produce an active dehydrogenating catalyst.

9. A process for dehydrogenating a paraffinic hydrocarbon which comprises subjecting the paraffinic hydrocarbon at a temperature from about 750° to about 1400° F. to contact with a catalyst prepared by precipitating alumina hydrogel, freezing and then thawing said hydrogel to destroy its gelatinous structure and to convert it into a finely divided powder, and compositing with said powder at least one additional metal oxide having dehydrogenating activity.

10. A process for dehydrogenating an olefinic hydrocarbon which comprises subjecting the olefinic hydrocarbon at a temperature from about 750° to about 1400° F. to contact with a catalyst prepared by precipitating alumina hydrogel, freezing and then thawing said hydrogel to destroy its gelatinous structure and to convert it into a finely divided powder, and compositing with said powder at least one additional metal oxide having dehydrogenating activity.

11. A process for dehydrogenating an arylalkane hydrocarbon which comprises subjecting the arylalkane hydrocarbon at a temperature from about 750° to about 1400° F. to contact with a catalyst prepared by precipitating alumina hydrogel, freezing and then thawing said hydrogel to destroy its gelatinous structure and to convert it into a finely divided powder, and compositing with said powder at least one additional metal oxide having dehydrogenating activity.

12. A hydrocarbon conversion process which comprises subjecting a hydrocarbon under conversion conditions to contact with a catalyst comprising at least two components and prepared by forming a gelatinous hydrogel of one of said components, freezing and then thawing said hydrogel to destroy its gelatinous structure, and thereafter compositing the other of said components with the first-mentioned component.

JOHN F. STURGEON.